United States Patent
Oda et al.

(10) Patent No.: US 9,413,455 B2
(45) Date of Patent: Aug. 9, 2016

(54) APPARATUS AND METHOD FOR CREATING CALIBRATION COEFFICIENT USED TO MONITOR OPTICAL SIGNAL-TO-NOISE RATIO

(71) Applicant: FUJITSU LIMITED, Kawasaki-shi, Kanagawa (JP)

(72) Inventors: Shoichiro Oda, Fuchu (JP); Yasuhiko Aoki, Yokohama (JP); Jeng-Yuan Yang, Garland, TX (US)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 14/555,922

(22) Filed: Nov. 28, 2014

(65) Prior Publication Data

US 2015/0155935 A1    Jun. 4, 2015

(30) Foreign Application Priority Data

Dec. 3, 2013   (JP) .................................. 2013-249817

(51) Int. Cl.
*H04B 10/079* (2013.01)
(52) U.S. Cl.
CPC ................................ *H04B 10/07953* (2013.01)
(58) Field of Classification Search
CPC ............. H04B 10/073; H04B 10/0775; H04B 10/07953
See application file for complete search history.

(56) References Cited

U.S. PATENT DOCUMENTS

| 6,433,864 | B1 | 8/2002 | Chung et al. |
| 6,952,529 | B1 | 10/2005 | Mittal |
| 2004/0126108 | A1 | 7/2004 | Chung et al. |
| 2004/0196158 | A1 | 10/2004 | Sugaya et al. |
| 2007/0242329 | A1* | 10/2007 | Ballegaard ........... G02B 26/123 359/202.1 |
| 2010/0008663 | A1* | 1/2010 | Gottwald .................. H04L 1/20 398/26 |
| 2010/0158532 | A1* | 6/2010 | Goto ................ H04B 10/07955 398/81 |
| 2012/0063772 | A1* | 3/2012 | Dahan .............. H04B 10/07953 398/26 |
| 2015/0010299 | A1 | 1/2015 | Wei et al. |

FOREIGN PATENT DOCUMENTS

| JP | 2004-287307 | 10/2004 |
| JP | 2009-244163 | 10/2009 |
| WO | 2013/139039 A1 | 9/2013 |

OTHER PUBLICATIONS

Extended European Search Report issued Apr. 24, 2015 in corresponding European Patent Application No. 14195615.1.

* cited by examiner

*Primary Examiner* — David Payne
*Assistant Examiner* — Casey Kretzer
(74) *Attorney, Agent, or Firm* — Staas & Halsey LLP

(57) ABSTRACT

An apparatus includes: a photodetector configured to create a first electric-signal from an optical signal; a power-measuring unit configured to measure power of the optical signal according to the first electric-signal; a noise calculating unit configured to calculate noise corresponding to a specified target optical signal-to-noise ratio (OSNR) according to the power of the optical signal, the power having been measured by the power-measuring unit, the specified target optical signal-to-noise ratio, and information representing characteristics of the photodetector; a noise generating unit configured to add the noise calculated by the noise calculating unit to the first electric-signal to generate a second electric-signal; an OSNR measuring unit configured to measure an optical signal-to-noise ratio according to the second electric-signal; and a calibration coefficient calculating unit configured to calculate a calibration coefficient used to obtain the target optical signal-to-noise ratio from the optical signal-to-noise ratio measured by the OSNR measuring unit.

15 Claims, 16 Drawing Sheets

APPARATUS AND METHOD FOR CREATING CALIBRATION COEFFICIENT USED TO MONITOR OPTICAL SIGNAL-TO-NOISE RATIO

CROSS-REFERENCE TO RELATED APPLICATION

This application is based upon and claims the benefit of priority of the prior Japanese Patent Application No. 2013-249817, filed on Dec. 3, 2013, the entire contents of which are incorporated herein by reference.

FIELD

The embodiments discussed herein are related to an apparatus and method for creating a calibration coefficient used to monitor an optical signal-to-noise ratio of an optical signal and to a method for monitoring an optical signal-to-noise ratio of an optical signal.

BACKGROUND

In an optical transmission system, an apparatus that monitors an optical signal-to-noise ratio (OSNR) is now in practical use to detect the state of an optical transmission apparatus, an optical transmitter and receiver, an optical transmission lines, and the like or to detect a failure therein. Since a structure in which one or both of the wavelength and path of an optical signal are dynamically changed will be used in a next-generation optical network, demands for monitoring optical signal quality can be thought to further increase.

When an OSNR monitor is mounted, it is desirable for a main signal (for example, an optical signal that transmits data) not to be affected. Specified monitoring precision is desirable in a case in which polarization multiplexing is performed or dispersion (such as wavelength dispersion or polarization mode dispersion) is present, or even in a case in which spectral narrowing occurs. In addition, a simple and inexpensive structure is desirable.

In an example of an OSNR monitor implemented with a simple structure, the structure is proposed as described below. An optical splitter leads an optical signal to a first path and a second path. An optical power measuring unit measures the strength of the optical signal on the first path. A noise measuring unit processes an alternate-current component of the optical signal that has selectively passed on the second path, and measures the strength of the noise of the processed alternate-current component. An OSNR calculating unit calculates the OSNR of the optical signal by comparing the measured signal strength with the measured noise strength. (Related technologies are described in, for example, U.S. Pat. No. 6,433,864 and Japanese Laid-Open Patent Publication Nos. 2004-287307 and 2009-244163.)

In the structures in the above related technologies (for example, the structure described in U.S. Pat. No. 6,433,864, it is desirable to obtain, in advance, a coefficient that is used to calculate an OSNR according to the measured signal strength and measured noise strength (the coefficient will be referred to below as the calibration coefficient). This calibration coefficient can be calculated by, for example, adding known amplified spontaneous emission (ASE) noise to an optical signal and measuring the OSNR of the optical signal with an optical spectrum analyzer. In an actually created optical transmission system, however, a special facility is used to add ASE noise to an optical signal and measure an OSNR with an optical spectrum analyzer. Another problem is that extra work and a cost are involved.

An object in an aspect of the present disclosure is to provide an apparatus and a method for creating a calibration coefficient used to monitor an optical signal-to-noise ratio with a simple structure.

SUMMARY

According to an aspect of the invention, a calibration coefficient creating apparatus includes: a photodetector configured to create a first electric signal from an optical signal; a power measuring unit configured to measure power of the optical signal according to the first electric signal; a noise calculating unit configured to calculate noise corresponding to a specified target optical signal-to-noise ratio according to the power of the optical signal, the power having been measured by the power measuring unit, the specified target optical signal-to-noise ratio, and information representing characteristics of the photodetector; a noise generating unit configured to add the noise calculated by the noise calculating unit to the first electric signal to generate a second electric signal; an OSNR measuring unit configured to measure an optical signal-to-noise ratio according to the second electric signal; and a calibration coefficient calculating unit configured to calculate a calibration coefficient used to obtain the target optical signal-to-noise ratio from the optical signal-to-noise ratio measured by the OSNR measuring unit.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Figure 1:
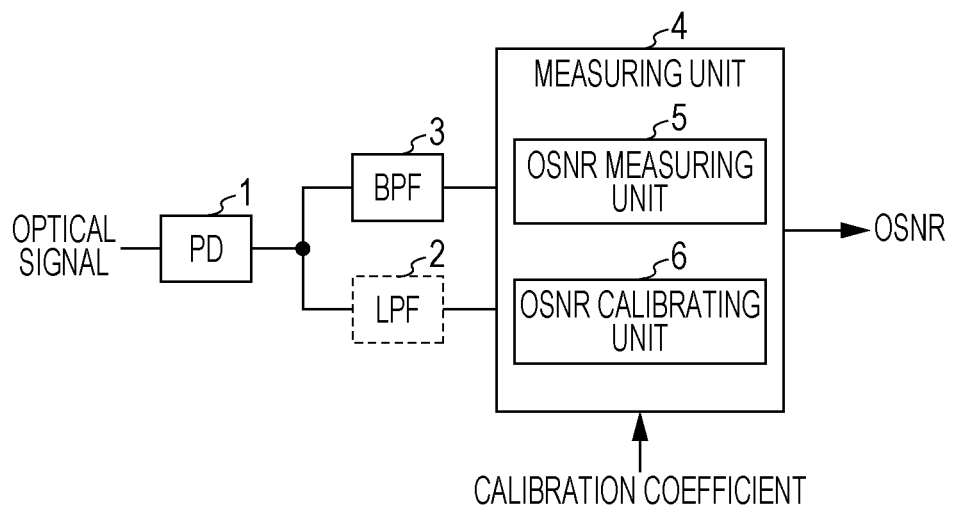
FIG. 1 outlines an OSNR measurement method.

FIG. 1 outlines an OSNR measurement method in an embodiment of the present disclosure. An apparatus that measures an OSNR includes a photodetector 1, a low-pass filter (LPF) 2, a band-pass filter (BPF) 3, and a measuring unit 4, as illustrated in FIG. 1.

Figure 2:
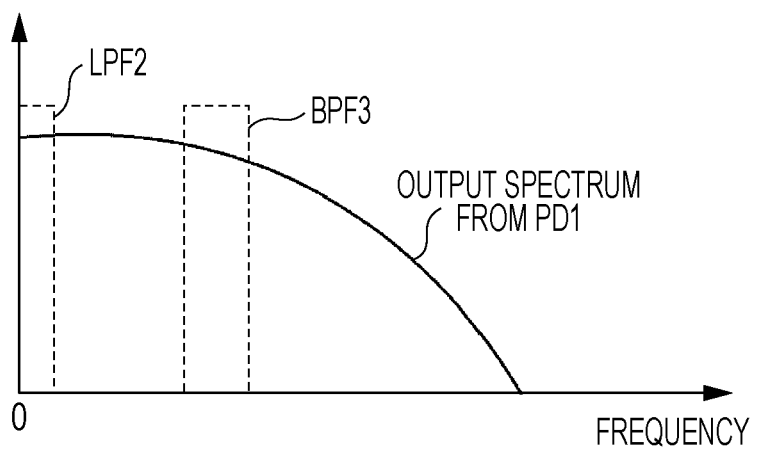
FIG. 2 schematically illustrates an output spectrum from a photodetector.

The photodetector 1, which includes a photodiode, converts an input optical signal to an electric signal. That is, the photodetector 1 creates an electric signal that represents an input optical signal. FIG. 2 schematically illustrates an output spectrum from the photodetector 1. In this example, input light incident on the photodetector 1 includes a signal and noise. The signal appears in the output spectrum from the photodetector 1 as a direct-current component. An alternate-current component in the output spectrum from the photodetector 1 represents noise.

The LPF 2 extracts a low-frequency component from an output signal from the photodetector 1, as illustrated in FIG. 2. That is, the LPF 2 extracts a prescribed frequency component including the direct-current component of the output signal from the photodetector 1. In the descriptions below, the frequency component extracted from the output signal from the photodetector 1 by the LPF 2 may be referred to as the first frequency component. Although there is no particular limitation to a cut-off frequency of the LPF 2, the cut-off frequency may be, for example, within a range of about several kilohertz to about to several tens of kilohertz.

The BPF 3 extracts, from the output signal from the photodetector 1, a prescribed frequency band component excluding the direct-current component, as illustrated in FIG. 2. That is, the BPF 3 extracts part of the alternate-current component of the output signal from the photodetector 1. In the descriptions below, the frequency component extracted from alternate-current component of the output signal from the photodetector 1 by the BPF 3 may be referred to as the second frequency component. Although there is no particular limitation to a central frequency of the passband of the BPF 3, the passband may be, for example, within a range of about a hundred kilohertz to about to several hundreds of kilohertz.

The measuring unit 4 measures an OSNR according to the power of an optical signal and the alternate-current component of an electric signal that represents the optical signal. Specifically, the measuring unit 4 measures the OSNR of an input optical signal according to the output signal from the LPF 2 and the output signal from the BPF 3. To measure the OSNR of the input optical signal, the measuring unit 4 includes an OSNR measuring unit 5 and OSNR calibrating unit 6.

The OSNR measuring unit 5 calculates a ratio between the first frequency component including the direct-current component of the output signal from the photodetector 1 and the second frequency component extracted from the alternate-current component of the output signal from the photodetector 1. The first frequency component is obtained from the output signal from the LPF 2, and the second frequency component is obtained from the output signal from the BPF 3.

The first frequency component depends on the strength or power of the signal component of the input light because the first frequency component includes the direct-current component of the output signal from the photodetector 1. The second frequency component depends on the strength or power of the noise component of the input light because the second frequency component is extracted from the alternate-current component of the output signal from the photodetector 1. Therefore, the ratio calculated by the OSNR measuring unit 5 between the first frequency component and the second frequency component represents a ratio between the signal and noise of the input light. The OSNR represents a ratio between an optical signal level and an optical noise level. Accordingly, the ratio calculated by the OSNR measuring unit 5 differs from the OSNR. However, the ratio calculated by the OSNR measuring unit 5 uniquely corresponds to an actual OSNR, so the ratio calculated by the OSNR measuring unit 5 can be used an index that represents an actual OSNR. In this description, therefore, the ratio calculated by the OSNR measuring unit 5 may be referred to as the OSNR.

Although, in an example, the OSNR measuring unit 5 calculates the ratio between the first frequency component and the second frequency component as an index that represents an actual OSNR, the present disclosure is not limited to this. The OSNR measuring unit 5 may output a value obtained by, for example, giving the first frequency component and second frequency component to a prescribed calculation equation.

The OSNR calibrating unit 6 calculates the actual OSNR from the OSNR measured by the OSNR measuring unit 5. In this description, a coefficient used to convert the OSNR measured by the OSNR measuring unit 5 to the actual OSNR is referred to as the calibration coefficient. That is, to calculate the actual OSNR, the OSNR calibrating unit 6 uses the calibration coefficient to calibrate the OSNR measured by the OSNR measuring unit 5.

The calibration coefficient can be calculated by adding predetermined amplified spontaneous emission (ASE) noise to an optical signal and then measuring the OSNR of the optical signal with an optical spectrum analyzer. To measure the OSNR in this method, however, a special facility for creating the calibration coefficient is used. With this method, extra work and a cost are also involved. A calibration coefficient creating unit and calibration coefficient creating method in an embodiment of the present disclosure create the calibration coefficient described above with a simple structure and method.

In the example in FIG. 1, the prescribed frequency component including the direct-current component of the output signal from the photodetector 1 (that is, the first frequency component) is obtained from the output from the LPF 2. However, the all frequency components of the output signal from the photodetector 1 may be used as the first frequency component. In this case, the OSNR measuring unit 5 measures the OSNR without the LPF 2, according to the output signal from the photodetector 1 and the output signal from the BPF 3. Since the output signal from the LPF 2 has fewer noise components than the output signal from the photodetector 1, the OSNR measured according to the output signal from the LPF 2 and the output signal from the BPF 3 has higher precision than the OSNR measured by the output signal from the photodetector 1 and the output signal from the BPF 3.

Figure 3:
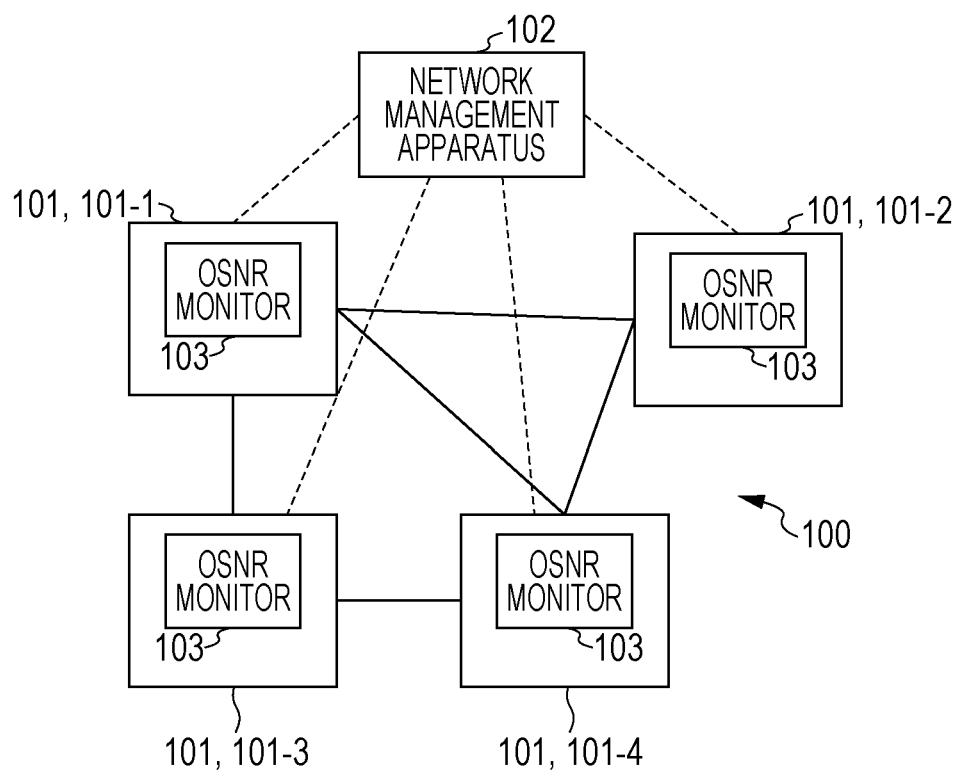
FIG. 3 illustrates an example of an optical transmission system in which OSNR monitors in an embodiment are used.

FIG. 3 illustrates an example of an optical transmission system in which OSNR monitors in an embodiment of the present disclosure are used. In the example in FIG. 3, optical transmission apparatuses 101 (101-1 to 101-4) are provided at individual nodes in the optical transmission system 100.

Each optical transmission apparatus 101 is connected to other optical transmission apparatus 101 through optical transmission path fibers. That is, each optical transmission apparatus 101 can transmit optical signals to other optical transmission apparatus 101 and can receive optical signals from other optical transmission apparatus 101. One or a plurality of optical amplifiers may be provided between nodes. The optical transmission system 100 transmits, for example, a wavelength division multiplexed (WDM) signal. In this case, the optical transmission apparatus 101 is structured so as to include an optical add-drop multiplexer (OADM). The OADM can branch a WDM signal to optical signals with desired wavelengths and can also insert a client signal to a WDM signal.

A network management apparatus 102 manages the structure, state, and operation of the optical transmission system 100. For example, the network management apparatus 102 can set specified paths in the optical transmission system 100.

Each optical transmission apparatus 101 includes an OSNR monitor 103. The OSNR monitor 103 monitors the OSNR of a received optical signal. The OSNR represents a ratio between the power or strength of an optical signal and the power or strength of optical noise. The OSNR monitor 103 monitors the OSNR in the method that has been described with reference to FIG. 1. Therefore, the OSNR monitor 103 calculates an actual OSNR from the measured OSNR by using the calibration coefficient described above.

In an embodiment, when measuring the OSNR of an optical signal, an optical transmission apparatus 101 uses the calibration coefficient created in the optical transmission apparatus 101 from which the optical signal has been transmitted. When, for example, the optical transmission apparatus 101-2 monitors the OSNR of an optical signal received from the optical transmission apparatus 101-1, the optical transmission apparatus 101-1 may create a calibration coefficient for the optical signal. In this case, the optical transmission apparatus 101-2 is notified of the calibration coefficient created by the optical transmission apparatus 101-1. The optical transmission apparatus 101-2 then calibrates the measured OSNR with the calibration coefficient of which optical transmission apparatus 101-2 has been notified to obtain an actual OSNR.

Figure 4:
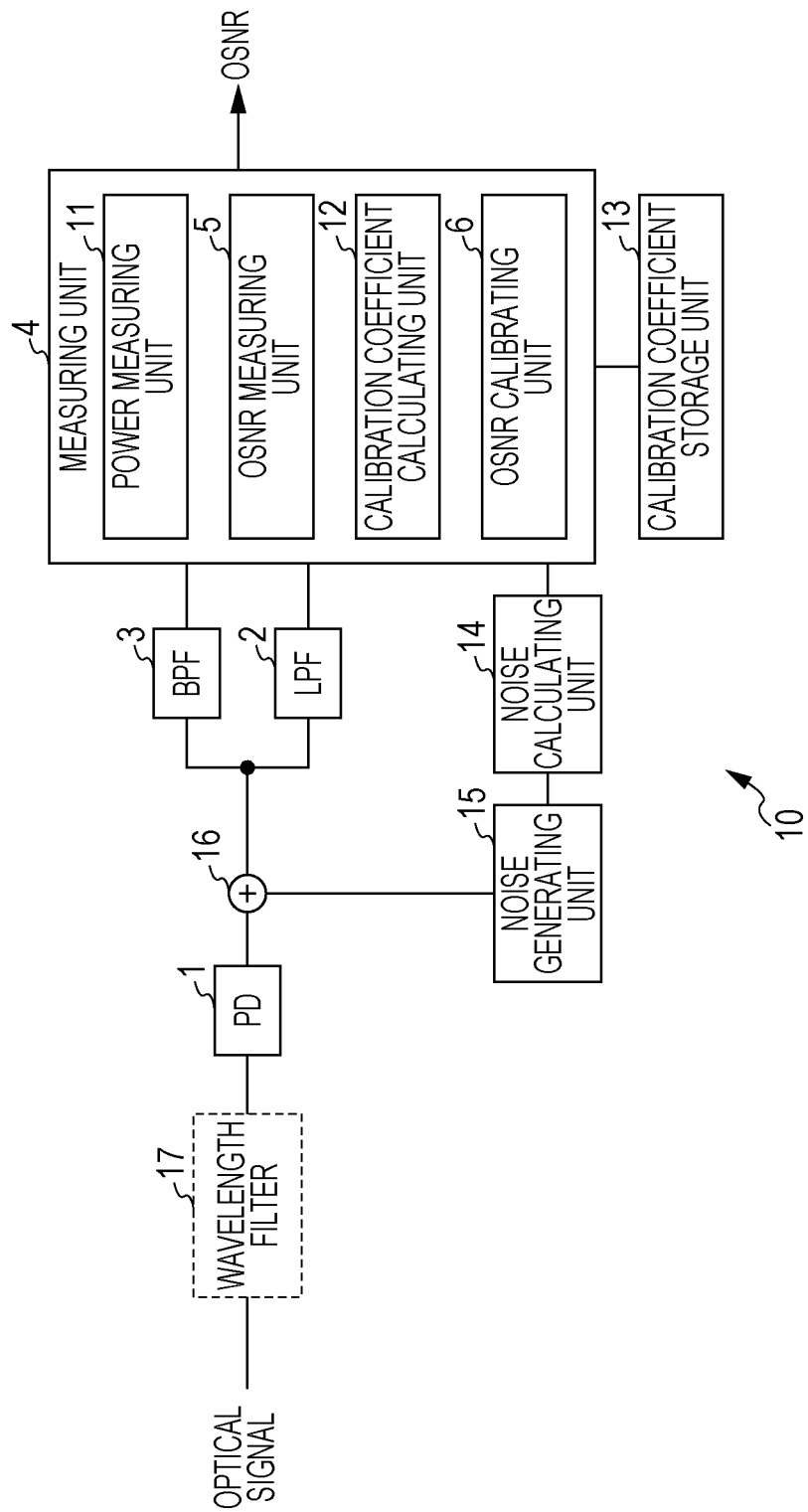
FIG. 4 illustrates the structure of an OSNR monitor in a first embodiment.

FIG. 4 illustrates the structure of an OSNR monitor in a first embodiment. As illustrated in FIG. 4, the OSNR monitor 10 includes a photodetector 1, an LPF 2, a BPF 3, a measuring unit 4, a calibration coefficient storage unit 13, a noise calculating unit 14, a noise generating unit 15, and an adder 16. The photodetector 1, LPF 2, and BPF 3 in FIG. 4 are essentially the same as in FIG. 1, so their descriptions will be omitted here.

Although, in the example in FIG. 4, the OSNR monitor 10 includes the LPF 2, this is not a limitation; the OSNR monitor 10 may not include the LPF 2. In the descriptions below, however, the OSNR monitor 10 includes the LPF 2.

The measuring unit 4 includes a power measuring unit 11, an OSNR measuring unit 5, a calibration coefficient calculating unit 12, and an OSNR calibrating unit 6. The OSNR measuring unit 5 and OSNR calibrating unit 6 in FIG. 4 are essentially the same as in FIG. 1. The measuring unit 4 is implemented by, for example, a processor system including a processor that executes programs in which the functions of the power measuring unit 11, OSNR measuring unit 5, calibration coefficient calculating unit 12, and OSNR calibrating unit 6 are coded. In this case, the processor system includes a memory. The measuring unit 4 may be implemented by hardware that provides the functions of the power measuring unit 11, OSNR measuring unit 5, calibration coefficient calculating unit 12, and OSNR calibrating unit 6. Alternatively, the measuring unit 4 may be implemented by a combination of software and hardware.

The OSNR monitor 10 has a function of creating the calibration coefficient described above, besides a function of measuring the OSNR of an input optical signal. The function of creating the calibration coefficient is implemented by, for example, the photodetector 1, LPF 2, BPF 3, power measuring unit 11, OSNR measuring unit 5, calibration coefficient calculating unit 12, noise calculating unit 14, noise generating unit 15, and adder 16. That is, the OSNR monitor 10 can operate as a calibration coefficient creating unit. The function of measuring the OSNR of an input optical signal is implemented by, for example, the photodetector 1, LPF 2, BPF 3, OSNR measuring unit 5, and OSNR calibrating unit 6.

When the OSNR monitor 10 creates the calibration coefficient, an optical signal that essentially includes no ASE noise is input to the OSNR monitor 10. The optical signal that essentially includes no ASE is implemented by, for example, an optical signal that transmits data. As an example, when the OSNR monitor 10 is included in an optical transmission apparatus having an optical transmitter that creates an optical signal, the optical signal created by the optical transmitter may be input to the OSNR monitor 10. In this case, the optical signal crated by the optical transmitter is preferably led to the OSNR monitor 10 without being amplified by an optical amplifier. The optical signal that essentially includes no ASE may be implemented by a special optical signal created separately from the optical signal that transmits data. In the descriptions below, the optical signal that essentially includes no ASE, the optical signal being used to create the calibration coefficient, may be referred to as the test optical signal.

The test optical signal is filtered by a wavelength filter 17, after which the filtered signal is led to the photodetector 1. The wavelength filter 17 extracts a signal's optical frequency component from input light. The wavelength filter 17 may be part of the OSNR monitor 10 or may be connected to the outside of the OSNR monitor 10.

The power measuring unit 11 measures the power of the input optical signal according to the output signal from the LPF 2. The output signal from the LPF 2 includes the signal component of the input light, as described above with reference to FIG. 2. In the descriptions below, therefore, the input optical signal power, which is measured according to the output signal from the LPF 2, may be denoted $P_{sig}$.

The noise calculating unit 14 calculates the amount of noise corresponding to a specified target OSNR according to the optical signal power $P_{sig}$ measured by the power measuring unit 11, the specified target OSNR, and information representing the characteristics of the photodetector 1. The target OSNR is, for example, an arbitrary or desired value in an allowable OSNR range determined in the optical transmission system 100 in FIG. 3. A method in which the noise calculating unit 14 calculates the amount of noise corresponding to the target OSNR will be described below.

When an optical signal is input to the photodetector 1, the signal-to-noise ratio of an output signal from the photodetector 1 is represented by equation (1) below (the ratio may be referred to below as the electric SNR).

$$SNR = \frac{I_{sig}^2}{\sigma^2} = \frac{R^2 P_{sig}^2}{\sigma_{shot}^2 + \sigma_T^2 + \sigma_{sig-ASE}^2 + \sigma_{ASE-ASE}^2} \quad (1)$$

In equation (1), $I_{sig}^2$ represents the intensity of the signal component of the output signal from the photodetector 1, $\sigma^2$ represents the intensity of the noise component of the output signal from the photodetector 1, R represents the sensitivity of the photodetector 1, $\sigma^2_{sig\text{-}ASE}$ represents the intensity of shot noise, $\sigma^2_T$ represents the intensity of thermal noise, a $\sigma^2_{sig\text{-}ASE}$ represents the intensity of signal-ASE beat noise, and $\sigma^2_{ASE\text{-}ASE}$ represents the intensity of ASE-ASE beat noise. That is, $\sigma^2$ is represented by the sum of shot noise, thermal noise, signal-ASE beat noise, ASE-ASE beat noise.

Shot noise and thermal noise do not essentially depend on ASE noise. That is, assuming that input light power is fixed, shot noise and thermal noise obtained when an optical signal including ASE is input are almost the same as shot noise and thermal noise obtained when an optical signal not including ASE noise (that is, test optical signal) is input. In other words, a difference between noise $\sigma^2$ obtained when an optical signal including ASE noise is input and noise $\sigma^2$ obtained when a test optical signal not including ASE noise is input is ascribable to signal-ASE beat noise and ASE-ASE beat noise.

Then, the noise calculating unit 14 calculates signal-ASE beat noise and ASE-ASE beat noise corresponding to the target OSNR. Signal-ASE beat noise is represented by equation (2) below. ASE-ASE beat noise is represented by equation (3) below.

$$\sigma_{sig\text{-}ASE}^2 = 4R^2 P_{sig} S_{ASE} \Delta f \quad (2)$$

$$\sigma_{ASE\text{-}ASE}^2 = 4R^2 S_{ASE}^2 B_{opt} \Delta f \quad (3)$$

In equations (2) and (3), R represents the sensitivity of the photodetector 1, $P_{sig}$ represents the optical signal power measured by the power measuring unit 11, and $S_{ASE}$ represents the specific power of an ASE spectrum. When the OSNR is known, the specific power of an ASE spectrum is essentially determined according to the optical signal power. If a target OSNR is given, therefore, the specific power of an ASE spectrum can be calculated according to the optical signal power measured by the power measuring unit 11. In addition, $\Delta f$ represents the frequency band of the photodetector 1 and $B_{opt}$ represents the optical bandwidth of ASE noise input to the photodetector 1. In the example in FIG. 4, for example, $B_{opt}$ is equivalent to the bandwidth of the wavelength filter 17 disposed on the input side of the photodetector 1.

As described above, parameters used to calculate signal-ASE beat noise and ASE-ASE noise are known or are measured by the measuring unit 4. If a target OSNR is given to the noise calculating unit 14, therefore, it can calculate signal-ASE beat noise and ASE-ASE beat noise corresponding to the target OSNR. In an example, the noise generating unit 15 outputs the sum of the signal-ASE beat noise and ASE-ASE beat noise.

The noise generating unit 15 generates noise calculated by the noise calculating unit 14. A method of generating electric noise corresponding to noise represented by the relevant equations is known. For example, a noise generator that generates desired noise is commercially available. Therefore, the noise generating unit 15 may use a known method to generate noise calculated by the noise calculating unit 14.

The adder 16 adds noise generated by the noise generating unit 15 to an output signal from the photodetector 1 (first electric signal). An electric signal including the noise generated by the noise generating unit 15 (second electric signal) is obtained.

As described above, the test optical signal does not include ASE noise. At a time when the test optical signal is input to the OSNR monitor 10, therefore, the output signal from the photodetector 1 includes shot noise and thermal noise but essentially includes neither signal-ASE beat noise nor ASE-ASE beat noise. Therefore, the noise of the second electric signal obtained by adding signal-ASE beat noise and ASE-ASE beat noise to the output signal from the photodetector 1 is equivalent to noise $\sigma^2$ (sum of shot noise, thermal noise, signal-ASE beat noise, and ASE-ASE beat noise) in equation (1).

Signal-ASE beat noise and ASE-ASE beat noise are calculated for a specified target OSNR. Therefore, the noise of the second electric signal is equivalent to noise added to an electric signal obtained when an optical signal having the target OSNR is input to the OSNR monitor 10. Alternatively, the electric SNR of the second electric signal is equivalent to the electric SNR obtained when an optical signal having the target OSNR is input to the OSNR monitor 10. As described above, the OSNR monitor 10 can generate an electric signal (here, second electric signal) obtained when an optical signal having the target OSNR is input to the OSNR monitor 10.

The OSNR measuring unit 5 measures an OSNR according to an electric signal to which noise generated by the noise calculating unit 14 has been added. Specifically, the OSNR measuring unit 5 measures an OSNR according to the output signals from the LPF 2 and BPF 3, as described above. For example, the OSNR measuring unit 5 calculates a ratio between the intensity of the output signal from the LPF 2 and the intensity of the output signal from the BPF 3.

The calibration coefficient calculating unit 12 calculates a calibration coefficient used to obtain the target OSNR described above from the OSNR measured by the OSNR measuring unit 5. In other words, the calibration coefficient calculating unit 12 calculates a calibration coefficient used to convert the OSNR measured by the OSNR measuring unit 5 to the target OSNR. A method of calculating a calibration coefficient will be described below.

As described above, the OSNR monitor 10 has been given a target OSNR. In this example, it is assumed that $OSNR_{target1}$ has been given as the target OSNR. The noise calculating unit 14 generates noise corresponding to the target OSNR, and the OSNR measuring unit 5 measures the OSNR according to an electric signal to which the noise has been added. As a result, the OSNR measuring unit 5 calculates $OSNR_{monitor1}$ for the target OSNR. The OSNR measured by the OSNR measuring unit 5 can be thought to be proportional to the target OSNR. Then, equation (4) below can be obtained.

$$OSNR_{monitor1} = a \times OSNR_{target1} \quad (4)$$

The actual OSNR of the input optical signal can be represented by equation (5) below.

$$OSNR = b \times OSNR_{monitor} \quad (5)$$

where "b" is the reciprocal of "a" in equation (4) and $OSNR_{monitor}$ represents the OSNR measured by the OSNR measuring unit 5 for the input optical signal.

The calibration coefficient calculating unit 12 outputs "b" as a calibration coefficient. The calibration coefficient calculated by the calibration coefficient calculating unit 12 is stored in the calibration coefficient storage unit 13. The calibration coefficient storage unit 13 is implemented by, for example, a memory accessible to the measuring unit 4 or a memory built into the measuring unit 4. The calibration coefficient storage unit 13 can also store a calibration coefficient created by another optical transmission apparatus.

Figure 5:
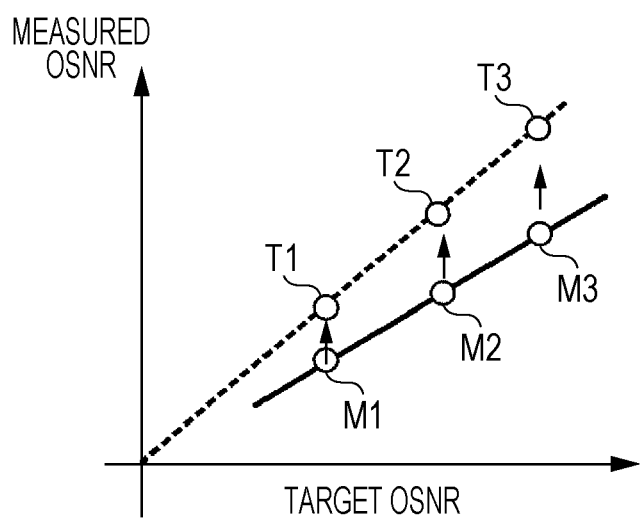
FIG. 5 illustrates an example of a method of calculating a calibration coefficient.

FIG. 5 illustrates another calibration coefficient calculating method. In FIG. 5, the horizontal axis represents the target OSNR and the vertical axis represents the measured OSNR.

In this method, the OSNR monitor 10 is given a plurality of different target OSNRs (T1, T2, and T3). The noise calculating unit 14 generates noise corresponding to each target OSNR. The OSNR measuring unit 5 measures an OSNR according to an electric signal to which noise corresponding to relevant target OSNR has been added. As a result, OSNRs (M1, M2, and M3) are measured by the OSNR measuring unit 5 for these target OSNRs (T1, T2, and T3).

The calibration coefficient calculating unit 12 creates a relational equation that uniquely associates a straight line representing the target OSNRs (T1, T2, and T3) with a straight line representing the measured OSNRs (M1, M2, and M3) by, for example, a least squares method. In this case, equation (6) below is obtained.

$$OSNR_{monitor} = a \times OSNR_{target} + b \quad (6)$$

Then, the actual OSNR of the input optical signal is represented by equation (7) below.

$$OSNR = (OSNR_{monitor} - b)/a \quad (7)$$

where $OSNR_{monitor}$ represents the OSNR measured by the OSNR measuring unit 5 for the input optical signal.

In this case, the calibration coefficient calculating unit 12 outputs "a" and "b" as calibration coefficients. The calibration coefficients calculated by the calibration coefficient calculating unit 12 are stored in the calibration coefficient storage unit 13.

As described above, the measuring unit 4 creates calibration coefficients by using test optical signals and stores the created calibration coefficients in the calibration coefficient storage unit 13.

The OSNR calibrating unit 6 uses a calibration coefficient to calibrate an OSNR measured by the OSNR measuring unit 5. That is, an optical signal for which to measure an OSNR (the optical signal will be referred to below as the optical signal under measurement) is input to the OSNR monitor 10. The photodetector 1 converts the optical signal under measurement to an electric signal. The LPF 2 and BPF 3 each filter the electric signal output from the photodetector 1. At that time, the noise calculating unit 14 and noise generating unit 15 are stopping. Therefore, no noise is added from the noise generating unit 15 to the output signal from the photodetector 1. The OSNR measuring unit 5 measures an OSNR according to the output signals from the LPF 2 and BPF 3. Thus, the OSNR of the optical signal under measurement is measured. To calculate the actual OSNR of the optical signal under measurement after that, the OSNR calibrating unit 6 uses a calibration coefficient to calibrate the OSNR measured by the OSNR measuring unit 5.

Figure 6:
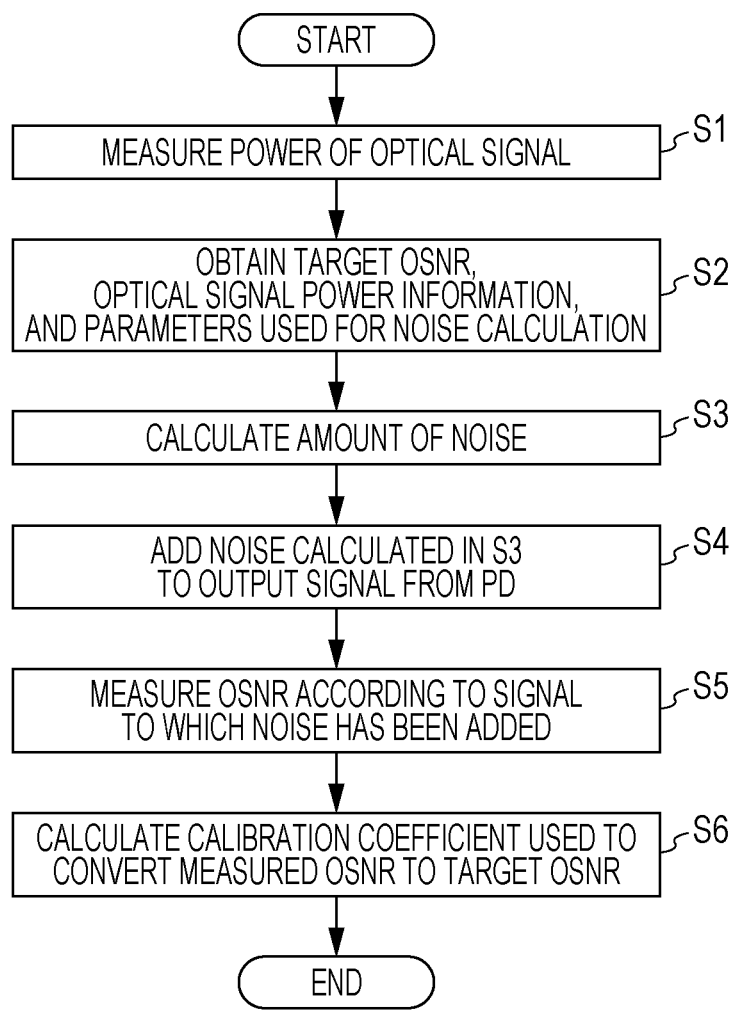
FIG. 6 is a flowchart illustrating a calibration coefficient creating method in the first embodiment.

FIG. 6 is a flowchart illustrating a calibration coefficient creating method in the first embodiment. When processing in this flowchart is executed, an optical signal including no ASE noise is (in the example described above, a test optical signal) is input to the OSNR monitor 10.

In S1, the power measuring unit 11 measures the power of the optical signal. Specifically, the photodetector 1 converts the input optical signal to an electric signal, after which the power measuring unit 11 measures the power of the input optical signal according to the intensity of the electric signal filtered by the LPF 2. The power measuring unit 11 may measure the power of the optical signal according to the output signal from the photodetector 1, without using the LPF 2.

In S2, the noise calculating unit 14 obtains a target OSNR, information representing optical signal power, and parameters used for noise calculation. The target OSNR is given to the OSNR monitor 10 by, for example, a network manager. The optical signal power is measured by the power measuring unit 11 in S1. The parameters used for noise calculation include information used to calculate noise in equations (2) and (3). That is, these parameters include information representing the characteristics of the photodetector 1 and information representing the bandwidth of the input light.

In S3, the noise calculating unit 14 calculates the amount of noise according to the target OSNR, the information representing the optical signal power, and the parameters used for noise calculation. Specifically, the noise calculating unit 14 uses equation (2) to calculate signal-ASE beat noise and also uses equation (3) to calculate ASE-ASE beat noise.

In S4, the noise generating unit 15 generates the noise calculated by the noise calculating unit 14, after which the adder 16 adds the noise generated by the noise generating unit 15 to the output signal from the photodetector 1.

In S5, the OSNR measuring unit 5 measures the OSNR according to the electric signal to which the noise has been added. Specifically, the OSNR measuring unit 5 measures the OSNR according to the output signal from the LPF 2 and the output signal from the BPF 3.

In S6, the calibration coefficient calculating unit 12 calculates a calibration coefficient used to convert the measured OSNR to a target OSNR. The calibration coefficient is calculated according to, for example, equations (4) and (5) or to equations (6) and (7). The calibration coefficient calculated by the calibration coefficient calculating unit 12 is stored in the calibration coefficient storage unit 13.

The OSNR monitor 10 can use a calibration coefficient created by, for example, the OSNR monitor 10 to monitor the OSNR of the optical signal. The OSNR monitor 10 can also use a calibration coefficient created by another optical transmission apparatus to monitor the OSNR of the optical signal. A method of submitting a notification of a calibration coefficient created by a certain optical transmission apparatus to another optical transmission apparatus will be described below.

Figure 7:
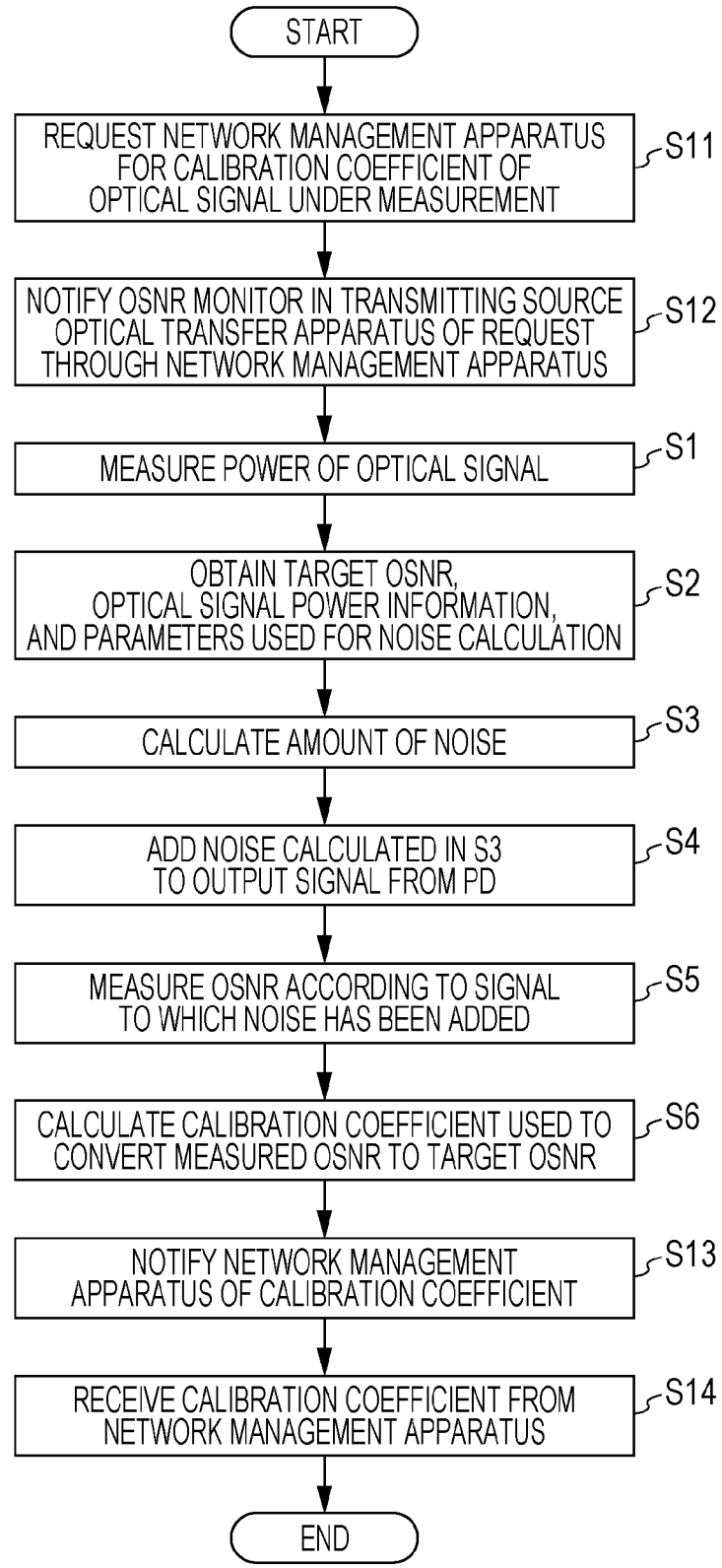
FIG. 7 is a flowchart illustrating a method of submitting a notification of a calibration coefficient in the first embodiment.

FIG. 7 is a flowchart illustrating a method of submitting a notification of a calibration coefficient. In the example in FIG. 7, an optical transmission apparatus that monitors the OSNR of an optical signal (this optical transmission apparatus will be referred to below as the monitoring apparatus) requests another optical transmission apparatus from which the optical signal has been transmitted to transmit a calibration coefficient.

In S11, the monitoring apparatus requests the network management apparatus 102 for the calibration coefficient of the optical signal under measurement. The network management apparatus 102 is assumed to manage all optical paths set in the optical transmission system 100. Therefore, the network management apparatus 102 can identify the transmitting source optical transmission apparatus from which the optical signal has been transmitted, the transmitting source optical transmission apparatus being involved in the requested calibration coefficient.

In S12, the network management apparatus 102 requests the identified optical transmission apparatus, which is the transmitting source, for the calibration coefficient of the optical signal under measurement. This request is given to the OSNR monitor 10 in the transmitting source optical transmission apparatus.

Upon receipt of the request, the OSNR monitor 10 executes the processing in S1 to S6, which has been described with reference to FIG. 6. Therefore, the OSNR monitor 10 creates the requested calibration coefficient.

In S13, the transmitting source optical transmission apparatus transmits the calibration coefficient created in S1 to S6 to the network management apparatus 102. The network management apparatus 102 then forwards the calibration coefficient to the monitoring apparatus. In S14, the monitoring apparatus receives the calibration coefficient of the optical signal under measurement from the network management apparatus 102.

Although, in the example in FIG. 7, the monitoring apparatus requests the network management apparatus 102 for a calibration coefficient, the present disclosure is not limited to this procedure. For example, the monitoring apparatus may request the transmitting source optical transmission apparatus for a calibration coefficient without the network management apparatus 102 intervening. In this case, the transmitting source optical transmission apparatus may transmit a calibration coefficient to the monitoring apparatus without the network management apparatus 102 intervening.

In the first embodiment, assuming that shot noise and thermal noise are fixed, the noise calculating unit 14 is calculated signal-ASE beat noise and ASE-ASE beat noise. However, shot noise is represented by the equation below.

$$\sigma^2_{shot}=2q\{R(P_{sig}+P_{ASE})\}\Delta f=2qRP_{sig}\Delta f+2qRP_{ASE}\Delta f$$

where "q" represents charge, which is $1.6 \times 10^{-19}$ C, $P_{sig}$ represents the power of an optical signal, and $P_{ASE}$ represents the power of ASE noise.

If the power of the optical signal is assumed to be fixed, $2qRP_{sig}\Delta f$ is also fixed. That is, $2qRP_{sig}\Delta f$ is equivalent to shot noise generated when an optical signal including no ASE noise is input to the OSNR monitor 10. However, $2qRP_{ASE}\Delta f$ depends on ASE noise. Therefore, shot noise generated when an optical signal having a target OSNR is obtained by adding $2qRP_{ASE}\Delta f$ to shot noise corresponding to an optical signal including no ASE noise. In the descriptions below, $2qRP_{ASE}\Delta f$ may be referred to as differential shot noise.

In a second embodiment, therefore, the noise calculating unit 14 calculates differential shot noise besides signal-ASE beat noise and ASE-ASE beat noise. The noise generating unit 15 and adder 16 add signal-ASE beat noise, ASE-ASE beat noise, and differential shot noise to the output signal from the photodetector 1.

Figure 8:
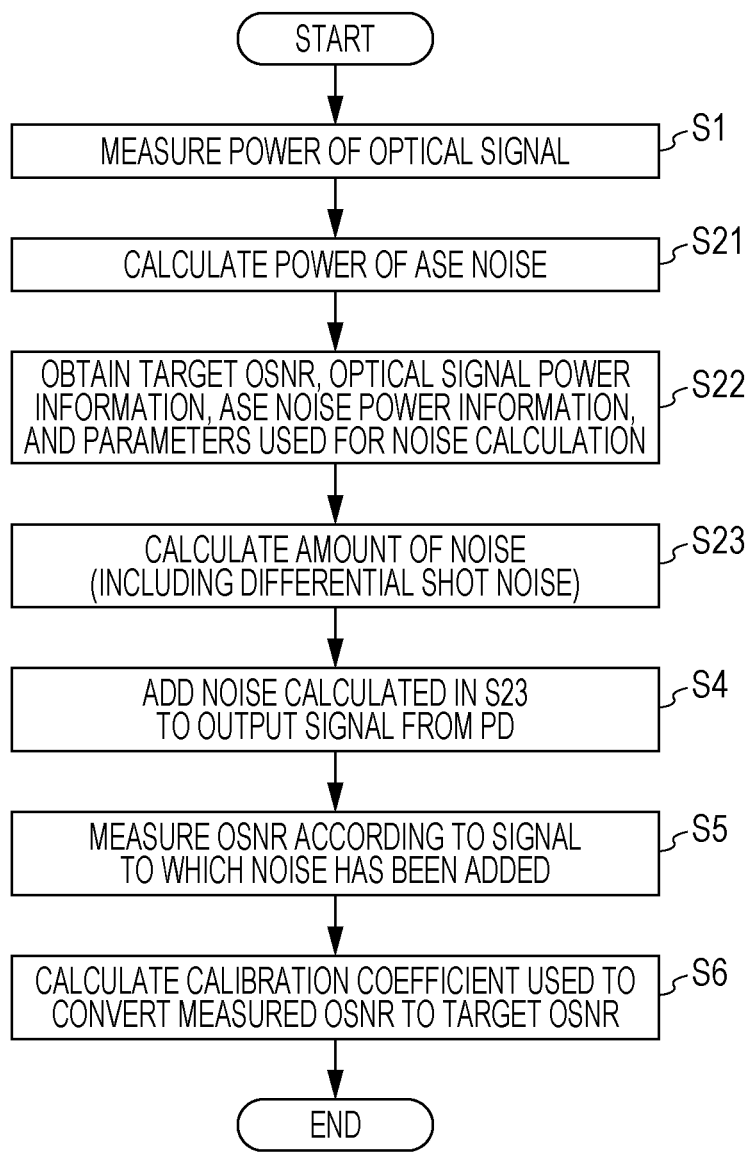
FIG. 8 is a flowchart illustrating a calibration creating method in a second embodiment.

FIG. 8 is a flowchart illustrating a calibration creating method in the second embodiment. In the second embodiment as well, an optical signal including no ASE noise (in the example above, the test optical signal) is input to the OSNR monitor 10 as in the first embodiment.

The processing in S1 and S4 to S6 in the second embodiment is the same as in the first embodiment. That is, a method of creating a calibration coefficient in the second embodiment is implemented by replacing S2 and S3 in the first embodiment with S21 to S23.

In S21, the power measuring unit 11 calculates the power of ASE noise. In this example, the power of ASE noise is calculated according to the power of the optical signal and the target OSNR. The value measured in S1 can be used as the power of the optical signal.

In S22, the noise calculating unit 14 obtains a target OSNR, information representing optical signal power, information representing ASE noise power, and parameters used for noise calculation. The target OSNR is given to the OSNR monitor 10 by, for example, a network manager. The optical signal power is measured by the power measuring unit 11 in S1. The ASE noise power is calculated in S2. The parameters used for noise calculation include information used to calculate noise in equations (2) and (3). That is, these parameters include information representing the characteristics of the photodetector 1 and information representing the bandwidth of the input light.

In S23, the noise calculating unit 14 calculates the amount of noise according to the target OSNR, the information representing the optical signal power, the information representing ASE noise power, and the parameters used for noise calculation. Specifically, the noise calculating unit 14 uses equation (2) to calculate signal-ASE beat noise and also uses equation (3) to calculate ASE-ASE beat noise as in the first embodiment. Furthermore, the noise calculating unit 14 uses ASE noise power $P_{ASE}$ to calculate differential shot noise $(2qRP_{ASE}\Delta f)$.

Then, the calculated noise is used to execute S4 to S6. Specifically, processing to add noise to the output signal from the photodetector 1, processing to measure an OSNR according to the signal to which the noise has been added, and processing to create, from the measured OSNR, a calibration coefficient used to obtain the target OSNR are executed.

In calibration coefficient creation in the second embodiment, differential shot noise (that is, $2qRP_{ASE}\Delta f$), which depends on ASE noise, is also considered in this way. Therefore, a more precise calibration coefficient can be created by the method in the second embodiment than by the method in the first embodiment. In general, however, ASE noise power $P_{ASE}$ is lower than optical signal power $P_{sig}$. Therefore, in the first embodiment as well in which the shot noise component, which depends on ASE noise, is not considered, an adequately superior calibration coefficient can be obtained.

Figure 9:
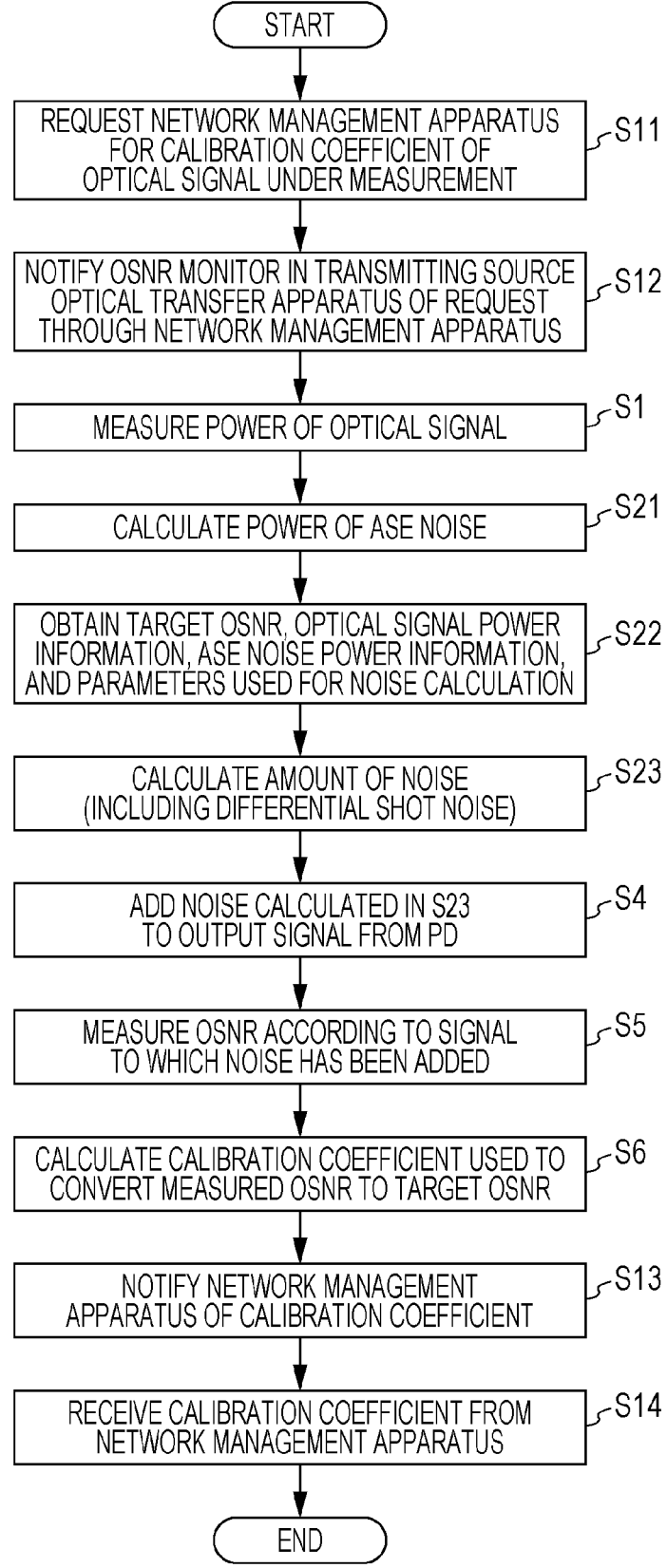
FIG. 9 is a flowchart illustrating a method of submitting a notification of a calibration coefficient in the second embodiment.

FIG. 9 is a flowchart illustrating a method of submitting a notification of a calibration coefficient in the second embodiment. In FIG. 9, S1, S21 to S23, and S4 to S6 are executed as described above with reference to FIG. 8 and S11 to S14 are executed as described above with reference to FIG. 7. Therefore, descriptions of FIG. 9 will be omitted.

Figure 10:
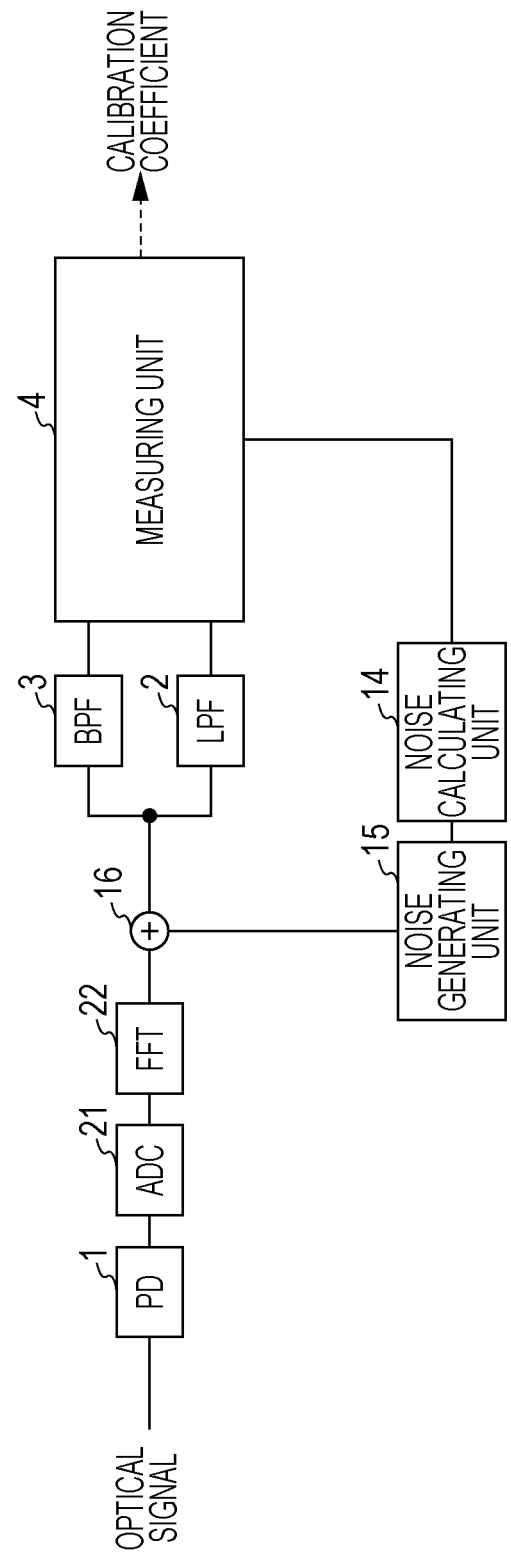
FIG. 10 illustrates the structure of an OSNR monitor in a third embodiment.

FIG. 10 illustrates the structure of an OSNR monitor in a third embodiment. In the third embodiment, the output signal from the photodetector 1 is converted to a digital signal by an analog-to-digital (AD) converter 21. A fast-Fourier transformer (FFT) 22 converts the digital signal output from the AD converter 21 to a frequency area signal. That is, the FFT 22 creates a frequency area signal representing an input optical signal. In the OSNR monitor in FIG. 10, a discrete Fourier transformer (DFT) may be used instead of the FFT 22. The LPF 2, BPF 3, measuring unit 4, noise calculating unit 14, noise generating unit 15, and adder 16 operate essentially as in the first or second embodiment.

In the third embodiment, the operations of the FFT 22, LPF 2, BPF 3, measuring unit 4, noise calculating unit 14, noise generating unit 15, and adder 16 are implemented by digital signal processing. Specifically, the LPF 2, BPF 3, measuring unit 4, noise calculating unit 14, noise generating unit 15, and adder 16 are implemented by, for example, a processor system having a processor and a memory. In this case, the AD converter 21 may be disposed in the processor system or may be externally connected to the processor system.

Figure 11:
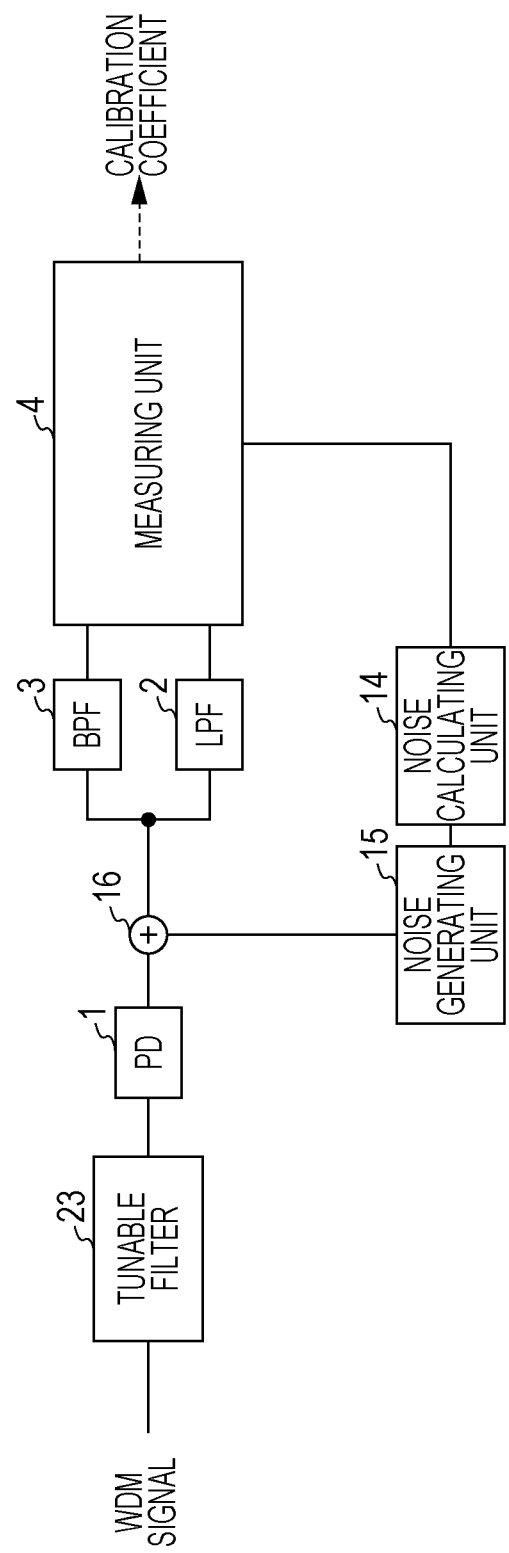
FIG. 11 illustrates the structure of an OSNR monitor in a fourth embodiment.

FIG. 11 illustrates the structure of an OSNR monitor in a fourth embodiment. The OSNR monitor in the fourth embodiment can create a calibration coefficient for each optical signal in a WDM signal. To achieve this, the OSNR monitor has a tunable filter 23 on the input side of the photodetector 1.

The tunable filter 23 can pass light with a specified wavelength. If a wavelength selection command is given to select one from a plurality of wavelength channels multiplexed in a WDM signal, therefore, the tunable filter 23 extracts an optical signal with the specified wavelength channel. The photodetector 1 converts the optical signal extracted by the tunable filter 23 to an electric signal. In this structure, the OSNR monitor can create a calibration coefficient for each optical signal in a WDM signal. In processing in which a calibration coefficient is created, however, each optical signal in the WDM signal is assumed to have essentially no ASE noise.

The structures in the third and fourth embodiments may be combined. For example, digital signal processing may be performed to create a calibration coefficient for an optical signal extracted by the tunable filter 23.

Figure 12:
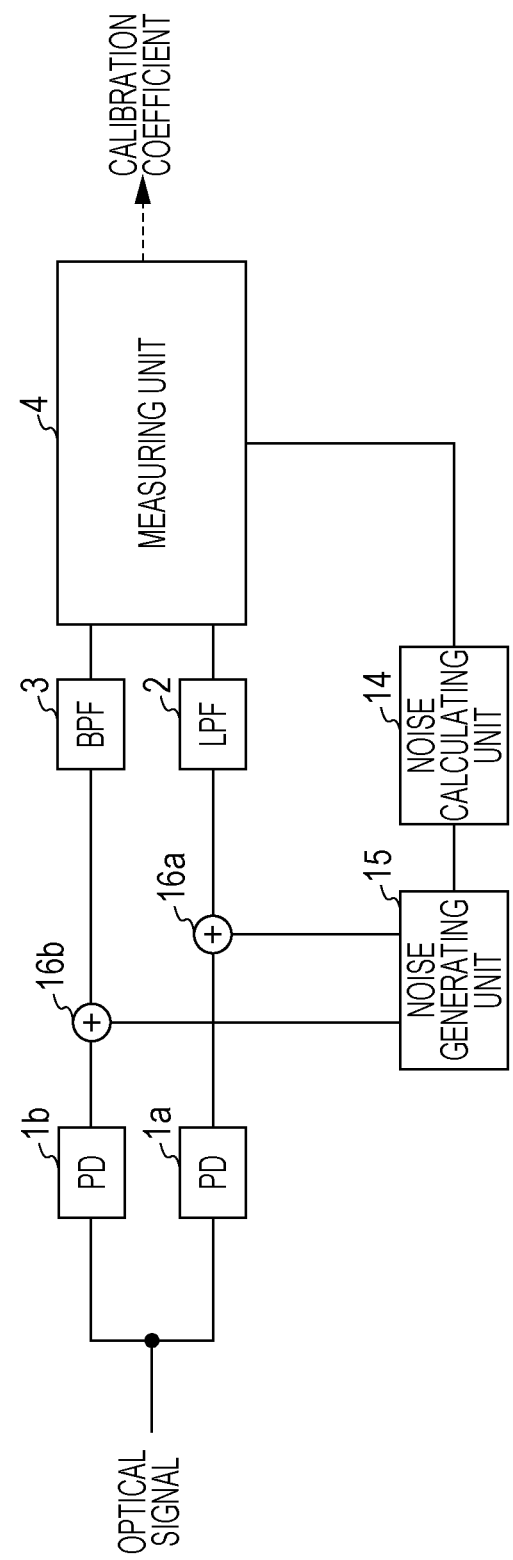
FIG. 12 illustrates the structure of an OSNR monitor in a fifth embodiment.

FIG. 12 illustrates the structure of an OSNR monitor in a fifth embodiment. In the fifth embodiment, an input optical signal is branched by, for example, an optical splitter (not illustrated) and led to photodetectors 1a and 1b. In this case, the branching ratio of the optical splitter is preferably 1:1. The photodetectors 1a and 1b preferably have the same characteristics.

An adder 16a is provided between the photodetector 1a and the LPF 2, and an adder 16b is provided between the photodetector 1b and the BPF 3. The adder 16a adds noise generated by the noise generating unit 15 to an output signal from the photodetector 1a. Similarly, the adder 16b adds noise generated by the noise generating unit 15 to an output signal from the photodetector 1b. The noise generating unit 15 gives essentially the same noise to the adders 16a and 16b.

The structures in the third and fifth embodiments may be combined. For example, to create a calibration coefficient, digital signal processing may be performed according to the output signals from the photodetectors 1a and 1b. The structures in the fourth and fifth embodiments may be combined. For example, an optical signal extracted from a WDM signal may be led to the photodetectors 1a and 1b.

Figure 13:
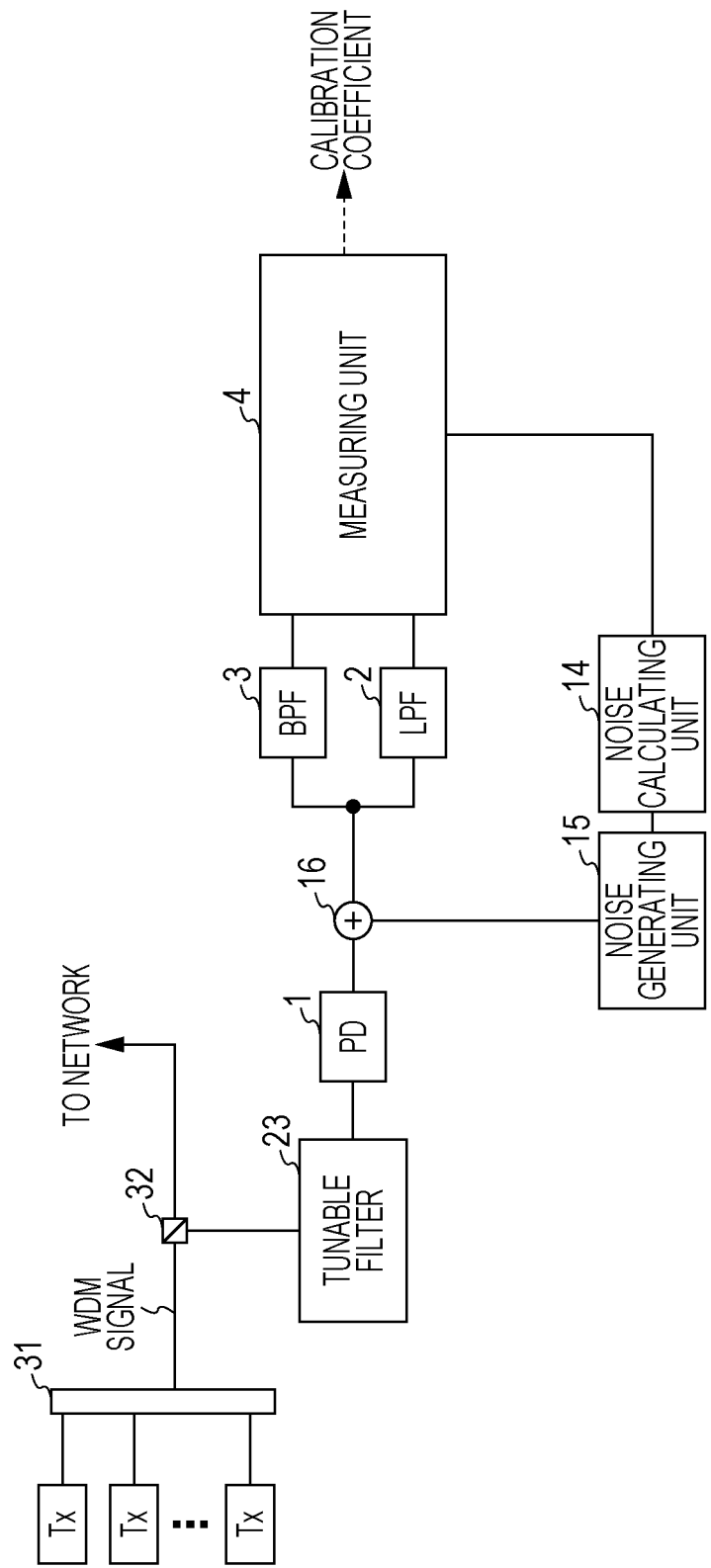
FIG. 13 illustrates the structure of an OSNR monitor in a sixth embodiment.

FIG. 13 illustrates the structure of an OSNR monitor in a sixth embodiment. The OSNR monitor in the sixth embodiment creates a calibration coefficient for each optical signal in a WDM signal transmitted from an optical transmission apparatus.

In FIG. 13, a plurality of optical transmitters Tx each create an optical signal and transmit it. The optical signals created by the plurality of optical transmitters Tx have mutually different wavelengths. A multiplexer 31 combines optical signals created by the plurality of optical transmitters Tx to create a WDM signal. The WDM signal is transmitted to another optical transmission apparatus through a network.

An optical splitter 32 branches the WDM signal output from the optical splitter 32 and leads a branched signal to the tunable filter 23, which has been described with reference to FIG. 11. A structure and a method for creating a calibration coefficient is the same as in, for example, the first or second embodiment.

In the structure in FIG. 13, an optical signal transmitted from an optical transmission apparatus is led to the OSNR monitor. Accordingly, ASE noise in an input optical signal to the OSNR monitor may be negligibly small. In this structure, therefore, an actually transmitted optical signal can be used to create a calibration coefficient in an optical transmission system, without preparing a special optical signal used to create a calibration coefficient.

Figure 14:
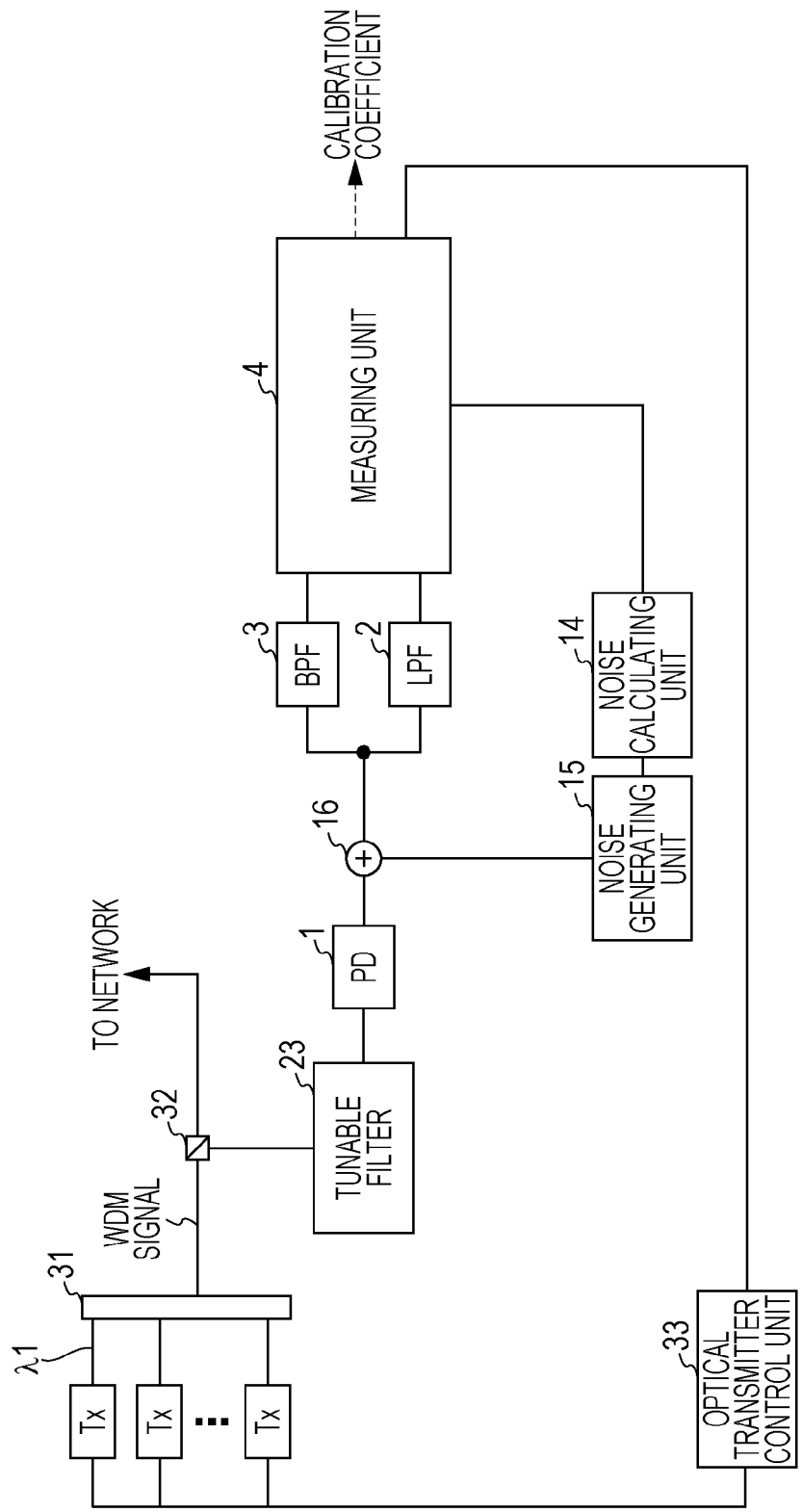
FIG. 14 illustrates the structure of an OSNR monitor in a seventh embodiment.

FIG. 14 illustrates the structure of an OSNR monitor in a seventh embodiment. The OSNR monitor in the seventh embodiment has the same structure as in FIG. 13 except that an optical transmitter control unit 33 is further provided.

In the seventh embodiment, a calibration coefficient is created for each optical signal type. This enables the measuring unit 4 to specify the type of an optical signal for which to create a calibration coefficient. In this case, the measuring unit 4 can specify a method of modulating the optical signal such as binary phase shift keying (BPSK), quadrature phase shift keying (QPSK), or 16 quadrature amplitude modulation (16QAM). The measuring unit 4 can also specify a baudrate or symbol rate of the optical signal. The measuring unit 4 may specify whether to perform polarization multiplexing, in which case, the measuring unit 4 may specify a wavelength channel for which to create a calibration coefficient.

The optical transmitter control unit 33 controls the optical transmitter Tx corresponding to the optical signal type specified by the measuring unit 4. If, for example, a wavelength channel $\lambda 1$ is specified, the optical transmitter control unit 33 commands an optical transmitter Tx that creates the wavelength channel $\lambda 1$ to create an optical signal in a specified modulation method or at a specified baudrate. Then, the tunable filter 23 extracts the wavelength channel $\lambda 1$ from the WDM signal.

As described above, in the seventh embodiment, a calibration coefficient can be created for each optical signal type. Even in an optical transmission system in which various types of optical signals are used, therefore, the OSNR of each optical signal can be precisely measured.

Figure 15:
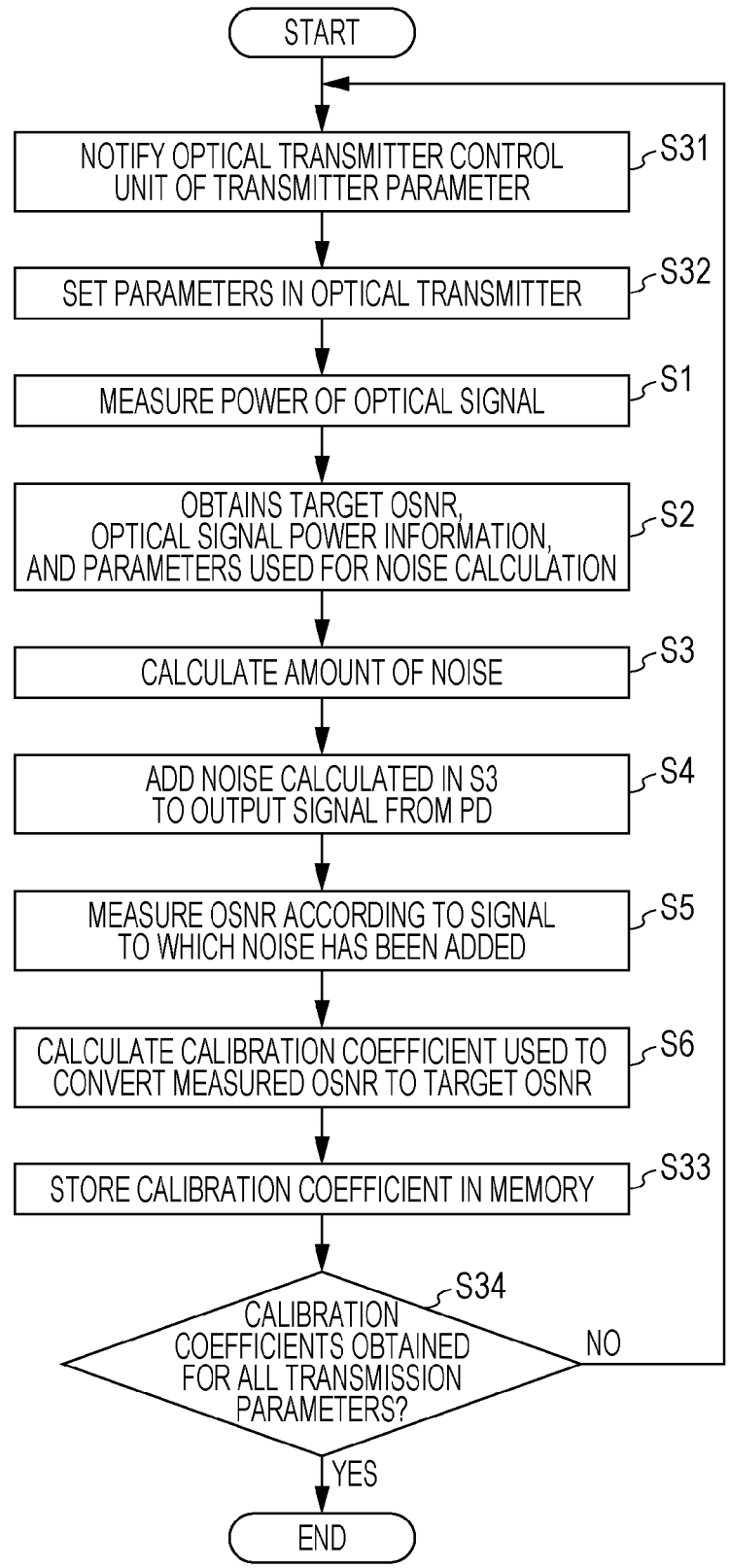
FIG. 15 is a flowchart illustrating a calibration coefficient creating method in the seventh embodiment.

FIG. 15 is a flowchart illustrating a calibration coefficient creating method in the seventh embodiment. In the seventh embodiment, a calibration coefficient is created for each of a plurality of signal types.

In S31, the measuring unit 4 selects one signal type for which to create a calibration coefficient from a plurality of signal types. A signal type is identified by, for example, a combination of a modulation method and a baudrate. The measuring unit 4 then notifies the optical transmitter control unit 33 of the transmitter parameter corresponding to the selected signal type.

In S32, the optical transmitter control unit 33 controls the optical transmitter Tx corresponding to the transmitter parameter of which the optical transmitter control unit 33 has been notified. For example, a mapping pattern in a mapper in the optical transmitter Tx is set. When a wavelength channel is specified by the measuring unit 4, the optical transmitter control unit 33 controls the optical transmitter Tx corresponding to the specified wavelength channel. The tunable filter 23 extracts the optical signal corresponding to the specified wavelength channel.

Processing in S1 to S6 is essentially the same as in the first embodiment. In the seventh embodiment, therefore, a calibration coefficient is created for the signal type specified by the measuring unit 4. In calibration coefficient creation in the seventh embodiment, the procedure, illustrated in FIG. 8, in the second embodiment may be executed instead of S1 to S6.

In S33, the measuring unit 4 stores the created calibration coefficient in a memory in correspondence to the specified signal type. In the structure in FIG. 4, the memory in which the calibration coefficient is stored is equivalent to the calibration coefficient storage unit 13.

In S34, the measuring unit 4 decides whether calibration coefficients have been obtained for all transmission parameters (that is, all signal types). If there is a transmission parameter for which a calibration coefficient has not yet been obtained, the processing in the measuring unit 4 returns to S31. That is, the measuring unit 4 repeatedly executes the processing in S31 to S33 until calibration coefficients are obtained for all transmission parameters. After calibration coefficients have been obtained for all transmission parameters, the processing in the measuring unit 4 is terminated.

Figure 16:
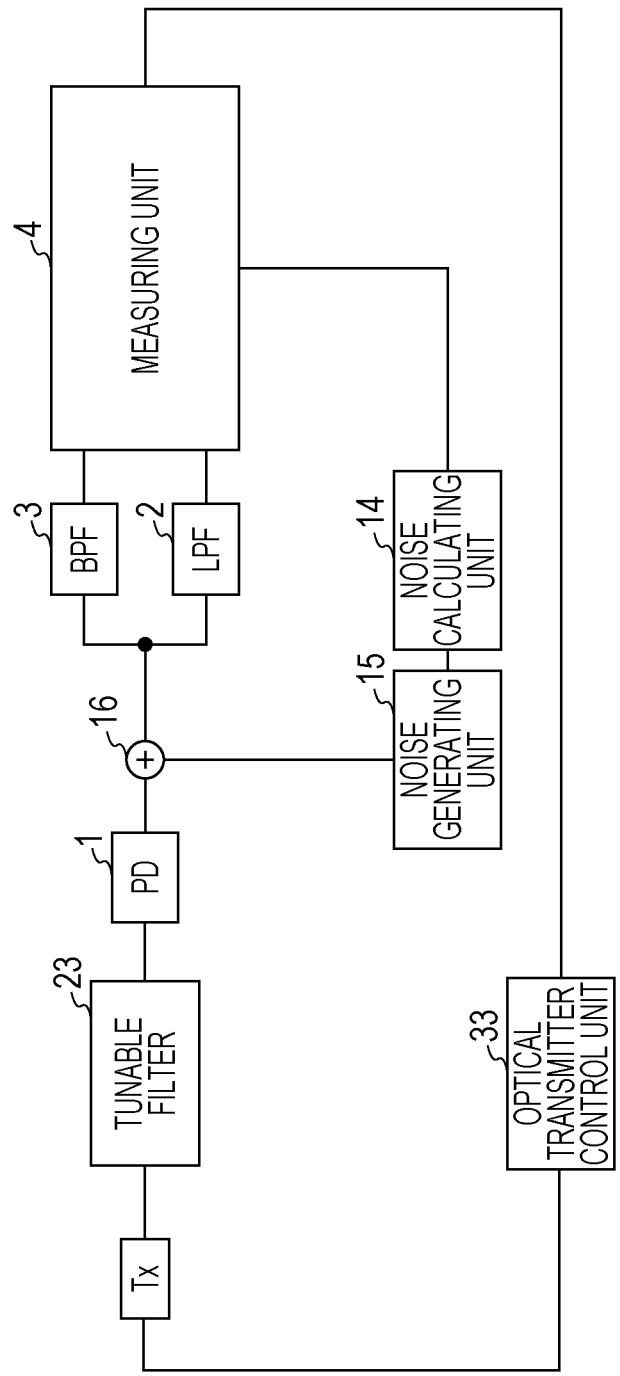
FIG. 16 illustrates a variation of the seventh embodiment.

FIG. 16 illustrates a variation of the seventh embodiment. In the structure in FIG. 16, an optical signal created by an optical transmitter Tx is input to the tunable filter 23. The optical transmitter Tx is controlled by the optical transmitter control unit 33 as described above with reference to FIG. 14. Specifically, the optical transmitter Tx is controlled so as to create an optical signal in a modulation method specified by the measuring unit 4 or at a baudrate specified by the measuring unit 4.

This structure is useful to obtain a calibration coefficient before an OSNR monitor or an optical transmission apparatus in which an OSNR monitor is mounted is placed in an optical transmission system. In this case, the optical transmitter Tx may be a special optical transmitter that is not mounted in the optical transmission apparatus.

Structure of an Optical Transmission Apparatus

Figure 17:
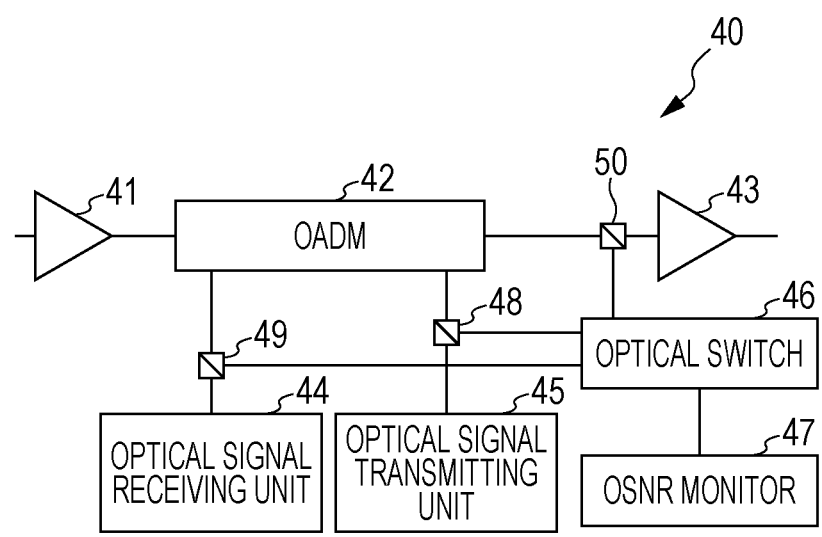
FIG. 17 illustrates an example of an optical transmission apparatus in which an OSNR monitor is mounted.

FIG. 17 illustrates an example of an optical transmission apparatus in which an OSNR monitor is mounted. The optical transmission apparatus 40 in FIG. 17 is used in a WDM system that transmits WDM signals. In FIG. 3, the optical transmission apparatus 40 is used as the optical transmission apparatus 101.

The optical transmission apparatus 40 includes optical amplifiers 41 and 43, an optical add-drop multiplexer (OADM) 42, an optical signal receiving unit 44, an optical signal transmitting unit 45, an optical switch 46, an OSNR monitor 47, and optical splitters 48 to 50, as illustrated in FIG. 17. The optical transmission apparatus 40 may include other circuit elements.

The amplifier 41 amplifies a received WDM signal. The OADM 42 selects an optical signal with a specified wavelength from the received WDM signal and leads the optical signal to the optical signal receiving unit 44. The OADM 42 can insert an optical signal transmitted from the optical signal transmitting unit 45 into the WDM signal. The amplifier 43 amplifies the WDM signal output from the OADM 42.

The optical signal receiving unit 44 receives the optical signal selected from the received WDM signal. The optical signal receiving unit 44 may have a plurality of optical receivers. The optical signal receiving unit 44 may also have an interface that converts a received optical signal to a client signal and leads the client signal to the relevant client. The optical signal transmitting unit 45 can create one or a plurality of optical signals and can transmit them to the OADM 42. When a plurality of optical signals are created, they have mutually different wavelengths. The optical signal transmitting unit 45 may create an optical signal that transmits, for example, client data and may transmit the optical signal to the OADM 42.

The optical splitter 48 can lead an optical signal created by the optical signal transmitting unit 45 to the optical switch 46. The optical splitter 49 can lead an optical signal selected from the received WDM signal to the optical switch 46. The optical splitter 50 can lead a WDM signal output from the OADM 42 to the optical switch 46. The optical switch 46 selects one of optical signals led from the optical splitters 48, 49, and 50 in response to a command received from the OSNR monitor 47.

The OSNR monitor 47 is implemented by any one of the OSNR monitors in the embodiments illustrated in FIGS. 4 to 16. To create a calibration coefficient, the OSNR monitor 47 gives the optical switch 46 a command to select an optical signal led from the optical splitter 48. Thus, the optical signal created by the optical signal transmitting unit 45 is input to the OSNR monitor 47. An optical path from the optical signal transmitting unit 45 to the OSNR monitor 47 is adequately short, so ASE noise in the optical signal input to the OSNR monitor 47 is adequately small. Accordingly, the OSNR monitor 47 can use this optical signal to create a calibration coefficient. No optical amplifier is preferably provided on the optical path from the optical signal transmitting unit 45 to the OSNR monitor 47.

When the OSNR of an optical signal in a received WDM signal is monitored, the OSNR monitor 47 gives the optical switch 46 a command to select an optical signal led from the optical splitter 49 or 50. Thus, the optical signal selected from the received WDM signal is input to the OSNR monitor 47. To calculate an actual OSNR, the OSNR monitor 47 measures the OSNR of the optical signal and calibrates the measured OSNR with a calibration coefficient. The calibration coefficient used by the OSNR monitor 47 to calculate the actual OSNR may be a calibration coefficient created by the OSNR monitor 47 or a calibration coefficient obtained from another optical transmission apparatus.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A calibration coefficient creating apparatus, comprising:
   a photodetector configured to create a first electric signal from an optical signal;
   a power measuring unit configured to measure power of the optical signal according to the first electric signal;
   a noise calculating unit configured to calculate noise corresponding to a specified target optical signal-to-noise ratio (OSNR) according to the power of the optical signal, the power having been measured by the power measuring unit, the specified target optical signal-to-noise ratio, and information representing characteristics of the photodetector;
   a noise generating unit configured to add the noise calculated by the noise calculating unit to the first electric signal to generate a second electric signal;
   an OSNR measuring unit configured to measure an optical signal-to-noise ratio according to the second electric signal; and
   a calibration coefficient calculating unit configured to calculate a calibration coefficient used to obtain the target optical signal-to-noise ratio from the optical signal-to-noise ratio measured by the OSNR measuring unit; and
   one of:
      a transmitter control unit configured to control a modulation method applied to the optical signal in response to a command from the calibration coefficient calculating unit, the calibration coefficient calculated by the calibration coefficient calculating unit being adapted by the calibration coefficient calculating unit to the modulation method, and
      a transmitter control unit configured to control a baud rate of the optical signal in response to a command from the calibration coefficient calculating unit, the calibration coefficient calculated by the calibration coefficient calculating unit being adapted by the calibration coefficient calculating unit to the baud rate.

2. The calibration coefficient creating apparatus according to claim 1, wherein the optical signal includes essentially no amplified spontaneous emission (ASE) noise.

3. The calibration coefficient creating apparatus according to claim 1, wherein the power measuring unit measures the power of the optical signal according to the first electric signal, which has been filtered by a low-pass filter.

4. The calibration coefficient creating apparatus according to claim 1, wherein:
the noise calculating unit
calculates signal-ASE beat noise according to sensitivity of the photodetector, the power of the optical signal, the power having been measured by the power measuring unit, ASE spectrum specific power determined according to the target optical signal-to-noise ratio, and a frequency band of the photodetector, and
calculates ASE-ASE beat noise according to the sensitivity of the photodetector, the ASE spectrum specific power, an optical band of ASE noise, and the frequency band of the photodetector; and
the noise generating unit adds the signal-ASE beat noise and the ASE-ASE beat noise, which have been calculated by the noise calculating unit, to the first electric signal to create a second electric signal.

5. The calibration coefficient creating apparatus according to claim 4, wherein:
the noise calculating unit further calculates shot noise according to the power of the optical signal, the power having been measured by the power measuring unit, and the target optical signal-to-noise ratio; and
the noise generating unit adds the signal-ASE beat noise, the ASE-ASE beat noise, and the shot noise, which have been calculated by the noise calculating unit, to the first electric signal to create the second electric signal.

6. The calibration coefficient creating apparatus according to claim 1, further comprising a wavelength selecting filter configured to select an optical signal with a specified wavelength channel from the a wavelength division multiplexed (WDM) signal, the wavelength selecting filter being disposed on an input side of the photodetector, wherein
the calibration coefficient calculating unit creates a calibration coefficient corresponding to the wavelength channel of the optical signal selected by the wavelength selecting filter.

7. The calibration coefficient creating apparatus according to claim 1, wherein said one of is the transmitter control unit configured to control the modulation method.

8. The calibration coefficient creating apparatus according to claim 1, wherein said one of is the transmitter control unit configured to control the baud rate.

9. The calibration coefficient creating apparatus according to claim 1, wherein the OSNR measuring unit measures the optical signal-to-noise ratio according to a ratio between a first frequency component including a direct-current component of the second electric signal and a second frequency component extracted from an alternate-current component of the second electric signal.

10. A method of creating a calibration coefficient, the method comprising:
creating a first electric signal from an optical signal by using a photodetector;
measuring power of the optical signal according to the first electric signal;
calculating noise corresponding to a specified target optical signal-to-noise ratio according to the measured power of the optical signal, the specified target optical signal-to-noise ratio (OSNR), and information representing characteristics of the photodetector;
adding the calculated noise to the first electric signal to generate a second electric signal;
measuring an optical signal-to-noise ratio according to the second electric signal; and
creating a calibration coefficient used to obtain the target optical signal-to-noise ratio from the optical signal-to-noise ratio measured according to the second electric signal;
measuring an optical signal-to-noise ratio according to a third electric signal that is generated from an optical signal under measurement by using the photodetector or another photodetector having essentially the same characteristics as the photodetector;
calibrating the optical signal-to-noise ratio measured according to the third electric signal with the calibration coefficient and outputting the optical signal-to-noise ratio calibrated for the optical signal under measurement; and
one of:
controlling a modulation method applied to the optical signal based on the created calibration coefficient, wherein said creating the calibration coefficient creates the calibration coefficient to be adapted to the modulation method, and
controlling a baud rate of the optical signal based on the created calibration coefficient, wherein the creating the calibration coefficient creates the calibration coefficient to be adapted to the baud rate.

11. The method according to claim 10, wherein said one of is the controlling the modulation method.

12. The method according to claim 10, wherein said one of is the controlling the baud rate.

13. An optical transmission system including a first optical transmission apparatus and a second optical transmission apparatus, wherein:
the first optical transmission apparatus and the second optical transmission apparatus each include an optical signal-to-noise ratio (OSNR) monitor,
the OSNR monitor includes
a photodetector configured to create a first electric signal from an optical signal,
a power measuring unit configured to measure power of the optical signal according to the first electric signal,
a noise calculating unit configured to calculate noise corresponding to a specified target optical signal-to-noise ratio according to the power of the optical signal, the power having been measured by the power measuring unit, the specified target optical signal-to-noise ratio, and information representing characteristics of the photodetector,
a noise generating unit configured to add the noise calculated by the noise calculating unit to the first electric signal to generate a second electric signal,
an OSNR measuring unit configured to measure an optical signal-to-noise ratio according to the second electric signal,
a calibration coefficient calculating unit configured to calculate a calibration coefficient used to obtain the target optical signal-to-noise ratio from the optical signal-to-noise ratio measured by the OSNR measuring unit, and
one of:
a transmitter control unit configured to control a modulation method applied to the optical signal in response to a command from the calibration coefficient calculating unit, the calibration coefficient calculated by the calibration coefficient calculating unit being adapted by the calibration coefficient calculating unit to the modulation method, and
a transmitter control unit configured to control a baud rate of the optical signal in response to a command from the calibration coefficient calculating unit, the calibration coefficient calculated by the calibration coefficient calculating unit being adapted by the calibration coefficient calculating unit to the baud rate, wherein the first optical transmission apparatus notifies the second optical transmission apparatus of the calibration coefficient created by the OSNR monitor in the first optical transmission apparatus, and the OSNR monitor in the second optical transmission apparatus measures an optical signal-to-noise ratio of an optical signal received from the first optical transmission apparatus and calibrates the measured optical signal-to-noise ratio by using the calibration coefficient of which the second optical transmission apparatus has been notified by the first optical transmission apparatus.

14. The optical transmission system according to claim 13, wherein said one of is the transmitter control unit configured to control the modulation method.

15. The optical transmission system according to claim 13, wherein said one of is the transmitter control unit configured to control the baud rate.

* * * * *